US011941455B2

(12) United States Patent
Yudanov

(10) Patent No.: US 11,941,455 B2
(45) Date of Patent: Mar. 26, 2024

(54) SHADOW COMPUTATIONS IN BASE STATIONS

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 517 days.

(21) Appl. No.: 16/713,996

(22) Filed: Dec. 13, 2019

(65) Prior Publication Data
US 2021/0182119 A1  Jun. 17, 2021

(51) Int. Cl.
G06F 9/50 (2006.01)
G06N 20/00 (2019.01)
H04W 88/08 (2009.01)

(52) U.S. Cl.
CPC ........... G06F 9/5083 (2013.01); G06N 20/00 (2019.01); H04W 88/08 (2013.01)

(58) Field of Classification Search
CPC .. G06F 9/5083; G06F 9/5027; G06F 229/509; G06N 20/00; H04W 88/08
USPC ........................................................ 718/105
See application file for complete search history.

(56) References Cited

U.S. PATENT DOCUMENTS

| | | | |
|---|---|---|---|
| 6,370,378 B1 * | 4/2002 | Yahagi | G01S 5/0027 455/433 |
| 8,229,446 B2 | 7/2012 | Shin et al. | |
| 2008/0057971 A1 * | 3/2008 | Kim | H04W 52/343 455/450 |
| 2010/0159938 A1 | 6/2010 | Shin et al. | |
| 2013/0194943 A1 | 8/2013 | Davydov et al. | |
| 2014/0274084 A1 * | 9/2014 | Ross | H04L 67/1097 455/450 |
| 2015/0004975 A1 | 1/2015 | Yamamoto et al. | |
| 2016/0299856 A1 * | 10/2016 | Fruchter | G06F 13/1668 |
| 2018/0183855 A1 | 6/2018 | Sabella et al. | |
| 2019/0036639 A1 | 1/2019 | Huang et al. | |
| 2019/0068264 A1 * | 2/2019 | Agrawal | H04W 72/046 |

(Continued)

FOREIGN PATENT DOCUMENTS

| | | | |
|---|---|---|---|
| CN | 124 101 A | * | 6/1999 |
| CN | 1241101 A | * | 6/1999 |

(Continued)

OTHER PUBLICATIONS

International Search Report and Written Opinion, PCT/US2020/062981, dated Apr. 1, 2021.

(Continued)

*Primary Examiner* — Kwang B Yao
*Assistant Examiner* — Syed M Bokhari
(74) *Attorney, Agent, or Firm* — Greenberg Traurig

(57) ABSTRACT

Systems and methods for implementing shadow computations in base stations. The systems and methods can include a method including initiating, at a base station (such as a cellular base station), a shadow computation of a main computation executing for a mobile device. The main computation can include a computational task, and the shadow computation can be at least a part of or a derivative of the main computation. The method can also include executing, by the base station, the shadow computation.

24 Claims, 9 Drawing Sheets

(56) References Cited

U.S. PATENT DOCUMENTS

2019/0090158 A1* 3/2019 Das .................. H04L 67/12
2021/0182118 A1 6/2021 Sahin

FOREIGN PATENT DOCUMENTS

| | | |
|---|---|---|
| JP | 2003016043 | 1/2003 |
| JP | 2011257834 | 12/2011 |
| JP | 2017111727 | 6/2017 |

OTHER PUBLICATIONS

Matsumoto, Hiroya, "A Task Offloading Method Considering Mobility and Turning Behavior in Mobile-Edge Computing Architectures." IEICE Technical Report, The Institute of Electronics, Information and Communication Engineers, Mar. 8, 2019.

Dong, Luobing, et al., "Reliability-Aware Offloading and Allocation in Multilevel Edge Computing System." IEEE Transactions on Reliability, vol. 70 No. 1, IEEE, Mar. 2021.

Extended European Search Report, EP20899954.0, dated Nov. 6, 2023.

* cited by examiner

300

302
receiving and initiating, by a base station, a shadow computation of a main computation executing for a mobile device (e.g., the shadow computation can be received from the mobile device or another device)

304
executing, by the base station, the shadow computation

306
sending, by the base station, output data of the executed shadow computation to the mobile device or to another device

308
sending, by the base station, output data of the executed shadow computation to another base station

310 transfer criteria met?

312 Yes — sending, by the base station, the shadow computation to another base station

314a No — sending, by the base station, the shadow computation back to the mobile device

314b sending, by the other base station, the shadow computation back to the mobile device

FIG. 3

SHADOW COMPUTATIONS IN BASE STATIONS

FIELD OF THE TECHNOLOGY

At least some embodiments disclosed herein relate to shadow computations in base stations. And, at least some embodiments disclosed herein relate to a memory module with computation capability. Also, at least some embodiments disclosed herein relate to a system having a plurality of such memory modules.

BACKGROUND

A base station can be considered a land station in a land mobile service. The term can be used in the context of mobile telephony, wireless computer networking and other wireless communications and in land surveying. A cellular base station is a cellular-enabled mobile device site where antennae and electronic communications equipment are placed. The placement can be on a radio mast, tower, or other raised structure. Such a structure can create a cell (or adjacent cells) in a cellular network. The raised structure can support an antenna and one or more sets of transceivers, digital signal processors, control electronics, a GPS receiver for timing, primary and backup electrical power sources, and sheltering.

In general, a base station can include computer hardware components. And, computer hardware components can be mounted onto a printed circuit board (PCB). Computer hardware components also can be integrated into integrated circuits. Such integrated circuits can be mounted onto a PCB. PCB can mechanically support and electrically connect electronic components using conductive tracks, pads and other features.

Memory modules can include a PCB, in which multiple memory components are mounted onto a PCB. Examples of such memory modules include single in-line memory modules (SIMMs) and dual in-line memory modules (DIMMS). A single in-line memory module (SIMM) is a type of memory module containing random-access memory. A SIMM differs from a dual in-line memory module (DIMM) in that the contacts on a SIMM are redundant on both sides of the module. This is not the case with a DIMM. DIMMs have separate electrical contacts on each side of the module. Another difference is that SIMMs usually have a 32-bit data path, while DIMMs usually have a 64-bit data path. DIMMs are commonly used in current computers large enough to include one or more DIMMs, and a DIMM can include multiple dynamic random-access memory (DRAM) integrated circuits. For a smaller computer, such as laptop computers, often a small outline dual in-line memory module (SO-DIMM) is used.

Also, memory components can be integrated onto a system on a chip (SoC). A SoC is an integrated circuit (IC) that integrates computer components in a single chip. Computer components common in a SoC include a central processing unit (CPU), memory, input/output ports and secondary storage. A SoC can have all its components on a single substrate or microchip, and some chips can be smaller than a quarter. A SoC can include various signal processing functions and can include specialty processors or co-processors such as graphics processing unit (GPU). By being tightly integrated, a SoC can consume much less power than conventional multichip systems of equivalent functionality. This makes a SoC beneficial for integration of mobile computing devices (such as in smartphones and tablets). Also, a SoC can be useful for embedded systems and the Internet of Things (especially when the smart device is small).

BRIEF DESCRIPTION OF THE DRAWINGS

The present disclosure will be understood more fully from the detailed description given below and from the accompanying drawings of various embodiments of the disclosure.

FIGS. 3 and 4 illustrate flow diagrams of example operations that can be performed by the base stations shown in FIGS. 1 and 2, in accordance with some embodiments of the present disclosure.

DETAILED DESCRIPTION

Figure 1:
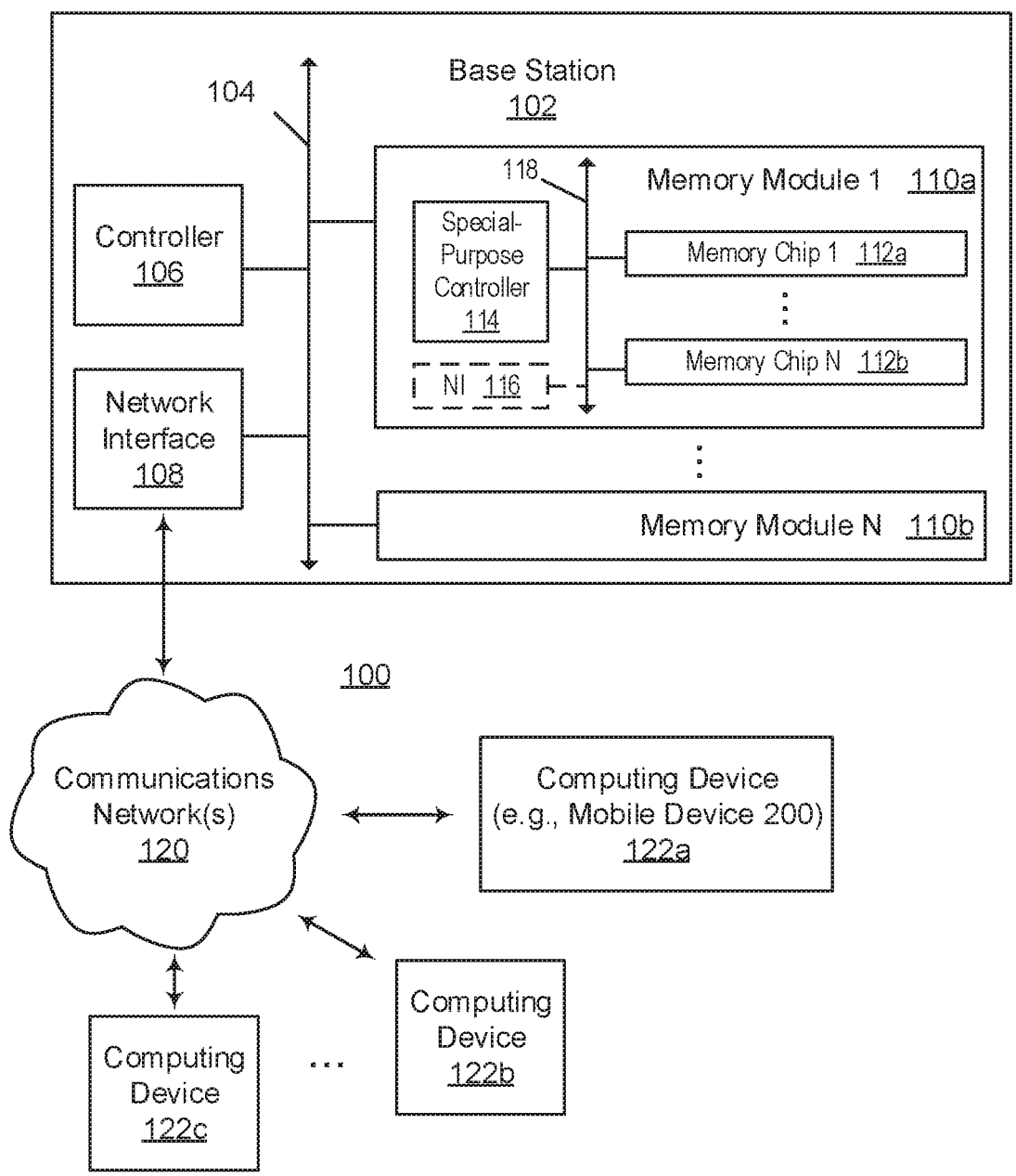
FIGS. 1 and 2 illustrates an example networked system that includes base stations that can provide shadow computations, in accordance with some embodiments of the present disclosure.

At least some embodiments disclosed herein relate to shadow computations in base stations. In some embodiments, computation of a mobile device is partly or fully offloaded to a base station, such as a cellular base station. The base station can include a computing device that includes a memory module or memory module system (such as a DIMM or a system having a plurality of DIMMs) that is configured with a special-purpose controller or even a central processing unit. As the mobile device moves from the range of one base station to another, the computation tasks of the mobile device can also move from one based station to another. For example, a closest based station can function as a shadow computing unit of the mobile device and perform shadow computations.

Also, at least some embodiments disclosed herein include systems and methods for implementing shadow computations in base stations. The systems and methods can include a method including initiating, at a base station (such as a cellular base station), a shadow computation of a main computation executing for a mobile device. The main computation can include a computational task, and the shadow computation can be at least a part of or a derivative of the main computation. The method can also include executing, by the base station, the shadow computation.

Furthermore, at least some embodiments disclosed herein relate to a memory module with computation capability. And, at least some embodiments disclosed herein relate to a system having a plurality of such memory modules. Such a memory module and such a system can be included in any one of the base stations disclosed herein. More specifically, at least some embodiments disclosed herein include a memory module having a plurality of memory chips, at least one controller (e.g., a central processing unit or special-purpose controller), and at least one interface device configured to communicate input and output data for the memory module. The input and output data bypasses at least one processor (e.g., a central processing unit) of a computing device in which the memory module is installed. And, the at least one interface device can be configured to communicate the input and output data to at least one other memory module in the computing device. Also, the memory module can be one module in a plurality of memory modules of a memory module system. Further, the memory module or the memory module system can be included in any one of the base stations disclosed herein.

In some embodiments, the memory module can be or include a DIMM, a SO-DIMM, a registered DIMM (RDIMM), a mini-RDIMM, a socketed memory stack, or a socketed system on package or another type of package on package (PoP) for memory. And, in some embodiments, the memory module can be configured to include a special-purpose chip, such as a GPU, an artificial intelligence (AI) accelerator, and/or a processing-in-memory (PIM) unit. Also, in some embodiments, the memory module is capable of outputting results to a peripheral device (e.g., a display or another type of user interface) through a wired connection, a wireless connection, or a combination thereof without going through a memory bus between a processor and the memory module. For example, in some embodiments, the memory module is capable of outputting results to a peripheral device through a wired connection or wireless connection or intra-chip optical interconnect without going through a memory bus between the memory module and the main processor of a computing device hosting the memory module. Such a memory module and other memory modules disclosed herein can accelerate processing of a graphics pipeline (e.g., data processing for geometry, projection, lighting, clipping, rasterization, shading, screen streaming, etc.). Also, a system having a plurality of such memory modules communicating with each other can further accelerate processing of a graphics pipeline.

FIG. 1 illustrates an example networked system 100 that is shown including at least a base station 102 (which can be a cellular base station) and computing devices 122a, 122b, and 122c. Shown in FIG. 2, the network system 100 is shown also including at least a mobile device 200 and base stations 222a, 222b, and 222c. The base stations 222a to 222c can be cellular base stations. The networked system 100 can provide shadow computations, in accordance with some embodiments of the present disclosure.

Figure 2:
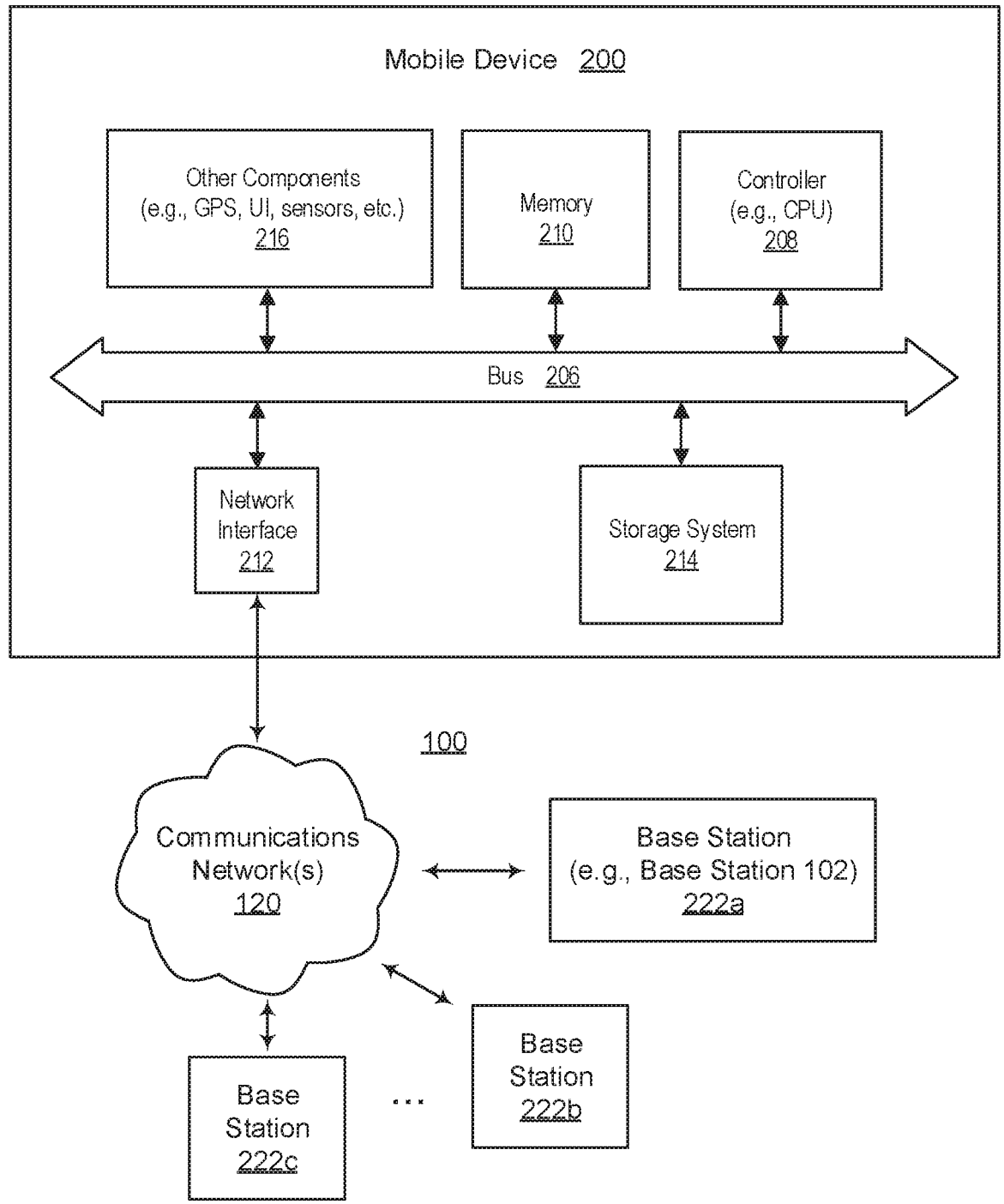

At least some of the illustrated components of FIG. 1 can be similar to the illustrated components of FIG. 2 functionally and/or structurally. For example, the computing devices 122a, 122b, and 122c each can have similar features and/or functionality as the mobile device 200. And, for example, the base station 102 can have similar features and/or functionality as each one of the base stations 222a, 222b, and 222c.

The networked system 100 in FIGS. 1 and 2 is networked via one or more communication networks 120. Communication networks described herein (such as network(s) 120) can include at least a local to device network such as Bluetooth or the like, a wide area network (WAN), a local area network (LAN), the Intranet, a mobile wireless network such as 4G or 5G, WiFi network, an extranet, the Internet, and/or any combination thereof. The networked system 100 can be a part of a peer-to-peer network, a client-server network, a cloud computing environment, or the like. Also, any of the computing devices described herein can include a computer system of some sort. And, such a computer system can include a network interface to other devices in a LAN, an intranet, an extranet, and/or the Internet (e.g., see network(s) 120). The computer system can also operate in the capacity of a server or a client machine in client-server network environment, as a peer machine in a peer-to-peer (or distributed) network environment, or as a server or a client machine in a cloud computing infrastructure or environment.

Also, FIG. 1 illustrates example parts of the example base station 102. The base station 102 can be communicatively coupled to the network(s) 120 as shown in FIGS. 1 and 2. The base station 102 includes at least a bus 104, a controller 106 (such as a CPU or specialized ASIC or FPGA), and a network interface 108. The base station 102 also include a plurality of memory modules (e.g., see memory modules 110a and 110b). The base station 102 can also include a data storage system (not depicted), and other components that can be part of a base station (not depicted). The other components of the base station 102, which are not depicted, can include parts of a cellular base station. A cellular base station for the purposes of this disclosure can be considered a cellular-enabled mobile device site where antennae and electronic communications equipment are placed. The placement can be on a radio mast, tower, or other raised structure. Such a structure can create a cell (or adjacent cells) in a cellular network. The raised structure can support an antenna and one or more sets of transceivers, digital signal processors, control electronics, a GPS receiver for timing, primary and backup electrical power sources, and sheltering.

The memory modules of the base station 102 and other base stations described herein (e.g., see memory modules 110a and 110b) each can include a special-purpose controller (e.g., see special-purpose controller 114), a plurality of memory chips (e.g., see memory chips 112a and 112b), and a memory bus (e.g., see memory bus 118) connecting the special-purpose controller to the plurality of memory chips. Each memory module can also include a network interface (e.g., see network interface 116). In embodiments where a memory module has a network interface, the memory bus (e.g., see memory bus 118) can connect the network interface and the special-purpose controller to the plurality of memory chips.

As shown in FIG. 1, the memory module 110a includes a special-purpose controller 114, a plurality of memory chips including memory chips 112a and 112b, a network interface 116, and a memory bus 118 that connects the special-purpose controller, the plurality of memory chips, and the network interface. Also, as shown, the network interface 116 is represented by a dashed-lined box which represents that the module having a network interface is optional. In such an embodiment including the network interface, the memory module can bypass communicating with external devices through the network interface 108, since the memory module has a respective network interface of its own. In embodiments where a memory module does not have a network interface, a network interface of the base station (e.g., see network interface 108) can be used to communicate with external devices. Such external devices being devices external to the base station 102.

In some embodiments, as mentioned, the base station 102 is, or includes, or is a part of a cellular base station. The cellular base station or the base station 102 can be configured to receive and/or initiate a shadow computation of a main computation executing for a mobile device (e.g., see computing devices 122a to 122c). The main computation can include a computational task, and the shadow computation can be at least a part of or a derivative of the main computation. The cellular base station or the base station 102 can also be configured to execute the shadow computation. In some embodiments, a special-purpose controller (e.g., see special-purpose controller 114) can be configured to receive and/or initiate the shadow computation of the main computation executing for the mobile device, and can be configured to execute the shadow computation.

The cellular base station or the base station 102 can also be configured to send output data of the executed shadow computation to the mobile device or to another device. In some embodiments, a special-purpose controller (e.g., see special-purpose controller 114) can be configured to send, via a network interface (e.g., see network interface 108 or network interface 116) and a communication network (e.g., see network(s) 120), output data of the executed shadow computation to the mobile device or to another device.

The cellular base station or the base station 102 can also be configured to send output data of the executed shadow computation to another base station (e.g., see base stations 222a, 222b, and 222c), such as another cellular base station. In some embodiments, a special-purpose controller (e.g., see special-purpose controller 114) can be configured to send, via a network interface (e.g., see network interface 108 or network interface 116) and a communication network (e.g., see network(s) 120), output data of the executed shadow computation to another base station (e.g., see base stations 222a to 222c), such as another cellular base station.

In some embodiments, the cellular base station or the base station 102 can also be configured to send the shadow computation back to the mobile device. In some embodiments, a special-purpose controller (e.g., see special-purpose controller 114) can be configured to send, via a network interface (e.g., see network interface 108 or network interface 116) and a communication network (e.g., see network(s) 120), the shadow computation back to the mobile device.

In some embodiments, the cellular base station or the base station 102 can also be configured to derive at least one other shadow computation from the shadow computation, and then send the other shadow computation(s) to at least one device other than the base station. For example, the cellular base station or the base station 102 can also be configured to derive other shadow computation(s) from the shadow computation, and then send the other shadow computation(s) to another base station or another cellular base station. In some embodiments, a special-purpose controller (e.g., see special-purpose controller 114) can be configured to derive other shadow computation(s) from the shadow computation, and then send, via a network interface (e.g., see network interface 108 or network interface 116) and a communication network (e.g., see network(s) 120), the other shadow computation(s) to at least one device other than the base station.

In some embodiments, the cellular base station or the base station 102 can also be configured to send the shadow computation to the other base station or cellular base station when the mobile device is within a threshold distance of the other base station or other cellular base station (e.g., see base stations 222a to 222c), when the other base station or other cellular base station experiences less network traffic than the base station or cellular base station, and/or when the other base station or other cellular base station has greater compute capabilities than the base station or the cellular base station. In some embodiments, a special-purpose controller (e.g., see special-purpose controller 114) can be configured to send, via a network interface (e.g., see network interface 108 or network interface 116) and a communication network (e.g., see network(s) 120), the shadow computation to the other base station or cellular base station when the mobile device is within a threshold distance of the other base station or other cellular base station (e.g., see base stations 222a to 222c), when the other base station or other cellular base station experiences less network traffic than the base station or cellular base station, and/or when the other base station or other cellular base station has greater compute capabilities than the base station or the cellular base station. In such embodiments and others, the other cellular base station or the other base station (e.g., see base stations 222a to 222c) can also be configured to send the shadow computation back to the mobile device. In some embodiments, a special-purpose controller of the other base station or other cellular base station can be configured to send, via a network interface and a communication network, the shadow computation back to the mobile device.

In some embodiments, the sending and the receiving of a shadow computation can be done entirely in one time period or in parts divided amongst multiple discrete time periods. Also, the sending and the receiving of a shadow computation can involve a complete migration of the computation such that an original computation in which the shadow computation is derived from no longer exists after migrating the shadow computation (such as migrating it from one device to another device). In transferring the shadow computation fully or partly, it can be divided by computational tasks. And, such divided tasks can be allocated amongst base stations or other types of devices or apparatuses. Also, a shadow computation can be derived from a recombined shadow computation from various origins, such that parts of the computation are run on less devices from more devices. In other words, one or more shadow computations can be consolidated from many devices to fewer devices or base stations. Furthermore, sending the output of a shadow computation can produce or originate a multitude of other shadow computations. And, such an action can also merge separated data sets of shadow computations and other related data, and when meeting certain criteria producing or terminating the related shadow computation(s).

As shown in FIG. 1, the bus 104 communicatively couples the controller 106, the network interface 108, and the plurality of memory modules (e.g., see memory modules 110a and 110b). The bus 104 can also communicatively couple such parts to other parts of the base station such as the data storage system and the other components. The base station 102 includes a computer system that includes at least the controller 106 and memory (see memory modules 110a and 110b)—which can include read-only memory (ROM), flash memory, dynamic random-access memory (DRAM) such as synchronous DRAM (SDRAM) or Rambus DRAM (RDRAM), static random-access memory (SRAM), cross-point or cross-bar memory, crossbar memory, etc.). The computer system can also include the data storage system that is not depicted, and such parts can communicate with each other via bus 104 (which can include multiple buses).

With respect to some embodiments, FIG. 1 includes a block diagram of a base station 102 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 108) to other machines in a LAN, an intranet, an extranet, and/or the Internet (e.g., see network(s) 120). The machine can operate in the capacity of a server or a client machine in client-server network environment, as a peer machine in a peer-to-peer (or distributed) network environment, or as a server or a client machine in a cloud computing infrastructure or environment.

Controller 106 of the base station can be or include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 106 can also be one or more special-purpose processing devices such as an ASIC, a programmable logic such as an FPGA, a digital signal processor (DSP), network processor, or the like. Controller 106 can be configured to execute instructions for performing at least some of the operations and steps discussed herein.

The data storage system of the base station 102 (not depicted) can include a machine-readable storage medium (also known as a computer-readable medium) on which is stored one or more sets of instructions or software that can embody one or more of the methodologies or functions described herein. The data storage system of the base station 102 can have execution capabilities such as it can at least partly execute instructions residing in the data storage system. The instructions can also reside, completely or at least partially, within the memory (e.g., see memory modules 110a and 110b) and/or within the controller 106 during execution thereof by the computer system, the memory and the controller of the base station also constituting machine-readable storage media. The memory of the base station 102 can be or include main memory. The memory of the base station 102 can have execution capabilities such as it can at least partly execute instructions residing in the memory.

The memory of the base station 102 (e.g., see memory modules 110a and 110b) as well as the memory of the computing devices described herein can include various types of memory. For example, such memory can include flash memory having flash memory cells. Also, for example, such memory can include dynamic random-access memory (DRAM) including DRAM cells. Also, for example, such memory can also include non-volatile random-access memory (NVRAM) including NVRAM cells. The NVRAM cells can include 3D XPoint memory cells.

Some embodiments can include a system for a base station such as a system including a plurality of memory modules (e.g., see memory modules 110a and 110b). Such a system can include a plurality of memory modules, wherein each memory module is configured for insertion into a printed circuit board (PCB) of the base station (e.g., see base station 102). And, in such embodiments, each memory module can include a plurality of memory chips (e.g., see memory chips 112a and 112b) and a special-purpose controller (e.g., see special-purpose controller 114).

In such embodiments and other described herein, the special-purpose controller can be, include, or be a part of a graphics processing unit (GPU) or an artificial intelligence (AI) accelerator. And, the special-purpose controller can be coupled to the plurality of memory chips. In such examples, the special-purpose controller can be configured to: receive and/or initiate a shadow computation of a main computation executing for a mobile device; and execute the shadow computation. The special-purpose controller in such examples can also be configured to send output data of the executed shadow computation to the mobile device. The special-purpose controller in such examples can also be configured to send output data of the executed shadow computation to another cellular base station. The special-purpose controller in such examples can also be configured to send the shadow computation to another cellular base station. The special-purpose controller in such examples can also be configured to send the shadow computation to the other cellular base station when the mobile device is within a threshold distance of the other cellular base station, when the other cellular base station experiences less network traffic than the cellular base station, and/or when the other cellular base station has greater compute capabilities than the cellular base station. The special-purpose controller in such examples can also be configured to send the shadow computation back to the mobile device.

Some embodiments can include an apparatus having a plurality of memory chips, a plurality of electrical contacts, and a special-purpose controller. And, such an apparatus can have a network interface device configured to communicate input and output data of the special-purpose controller over one or more communication networks that bypass a main processor of a computing device in which the apparatus is installed. The computing device in which the apparatus is installed can be a computing device of a base station (such as base station 102) or a computing device connected to a base station such as one connected via one or more networks (e.g., see network(s) 120), such as computing devices 122a to 122c.

In some embodiments, such an apparatus can include a printed circuit board (PCB) configured for insertion into a memory slot of a motherboard. And, the plurality of memory chips can be coupled to the PCB. And, the plurality of electrical contacts can be on each side of the PCB. Also, the special-purpose controller can be coupled to the PCB. And, the network interface device can be coupled to the PCB. In such examples and others, the special-purpose controller can include a graphics processing unit (GPU) and/or another type of special-purpose controller such as an AI accelerator. In such examples and others, the network interface device can include a wireless network interface device configured to communicate over one or more wireless networks. And, the one or more communication networks can bypass a main data bus of the computing device in which the apparatus is installed.

The apparatus can also include first connections configured to connect the plurality of memory chips to at least some of the plurality of electrical contacts to communicate input and output data of the plurality of memory chips to the main processor of the computing device in which the system is installed. The apparatus can also include second connections configured to connect the plurality of memory chips to the special-purpose controller. And, the apparatus can include a third connection configured to connect the special-purpose controller to the network interface device so that the network interface device receives input data for the special-purpose controller from other devices and communicates output data of the special-purpose controller to other devices via a communications path that bypasses the main processor of the computing device in which the apparatus is installed.

The apparatus can also include an arbiter configured to resolve conflicts when the main processor attempts to access data in the plurality of memory chips while the special-purpose controller is accessing the plurality of memory chips.

Some embodiments can include a system having a plurality of dual in-line memory modules (DIMMs). Each DIMM of the plurality of DIMMs can include a PCB configured for insertion into a memory slot of an additional PCB that is separate from the plurality of DIMMs. Each DIMM of the plurality of DIMMs can include a plurality of memory chips coupled to the PCB and a plurality of electrical contacts on each side of the PCB. Each DIMM of the plurality of DIMMs can include a special-purpose controller coupled to the PCB. And, each DIMM of the plurality of DIMMs can include a network interface device coupled to the PCB and configured to communicate over one or more communication networks that bypass a main processor of a computing device in which the system is installed. The computing device in which the system is installed can be a computing device of a base station (such as base station 102) or a computing device connected to a base station such as one connected via one or more networks (e.g., see network(s) 120), such as computing devices 122a to 122c.

In some embodiments, such a system can include an external controller that is separate from the plurality of DIMMs and that is configured to coordinate computations by the special-purpose controllers of the plurality of DIMMs. And, in such embodiments, the system can have the additional PCB that is separate from the plurality of DIMMs and that includes a plurality of memory slots configured to receive the plurality of DIMMs. And, the external controller can be coupled to the additional PCB. Also, in such embodiments, the additional PCB can be a motherboard and the external controller can include a central processing unit (CPU).

In such examples and others, the special-purpose controller can include a graphics processing unit (GPU) and/or another type of special-purpose controller such as an AI accelerator. And, in such examples and others the network interface device of each DIMM of the plurality of DIMMs can include a wireless network interface device configured to communicate over a wireless network.

In some embodiments, for each DIMM of the plurality of DIMMs, the wireless network interface device of the DIMM is configured to receive input data for the special-purpose controller and communicate output data of the special-purpose controller to one or more displays via one or more wireless communications links that bypass the main processor of the computing device in which the system is installed.

Some embodiments can include a DIMM. The DIMM can include a printed circuit board (PCB) configured for insertion into a memory slot of a motherboard. The DIMM can also include a plurality of memory chips coupled to the PCB and a plurality of electrical contacts on each side of the PCB. The DIMM can also include a special-purpose controller coupled to the PCB. The DIMM can also include a network interface device coupled to the PCB and configured to communicate input and output data of the special-purpose controller over one or more communication networks that bypass a main processor of a computing device in which the DIMM is installed. The computing device in which the DIMM is installed can be a computing device of a base station (such as base station 102) or a computing device connected to a base station such as one connected via one or more networks (e.g., see network(s) 120), such as computing devices 122a to 122c. In such embodiments and others, and where the DIMM is in a mobile device, the DIMM can be a small outline dual in-line memory module (SO-DIMM). Also, in such examples and others, the special-purpose controller includes a graphics processing unit (GPU) and/or another type of special-purpose controller such as an AI accelerator. And, in such examples and others, the network interface device can include a wireless network interface device configured to communicate over one or more wireless networks.

Further, in such examples and others, the DIMM can include first connections configured to connect the plurality of memory chips to at least some of the electrical contacts to communicate input and output data of the plurality of memory chips to the main processor of the computing device in which the system is installed. The DIMM can also include second connections configured to connect the plurality of memory chips to the GPU. And, The DIMM can include a third connection configured to connect the GPU to the network interface device so that the network interface device receives input data for the GPU from other devices and communicates output data of the GPU to other devices via a communications path that bypasses the main processor of the computing device in which the DIMM is installed.

Further, in such examples and others, the one or more communication networks bypass a main data bus of the computing device in which the DIMM is installed.

And, the DIMM can include an arbiter configured to resolve conflicts when a main processor attempts to access data in the plurality of memory chips while the special-purpose controller is accessing the plurality of memory chips of the DIMM.

FIG. 2 illustrates the example networked system 100 that includes at least computing devices 122a to 122c and base station 102 (e.g., see FIG. 1) and that includes mobile device 200 and base stations 222a, 222b, and 222c (e.g., see FIG. 2). The networked system 100 can provide shadow computations, in accordance with some embodiments of the present disclosure.

At least some of the illustrated components of FIG. 2 can be similar to the illustrated components of FIG. 1 functionally and/or structurally. For example, mobile device 200 can have similar features and/or functionality as any one of the computing devices 122a to 122c. And, for example, each one of base stations 222a to 222c can have similar features and/or functionality as base station 102.

Also, FIG. 2 illustrates example parts of the example mobile device 200. The mobile device 200 can be communicatively coupled to the network(s) 120 as shown in FIGS. 1 and 2. The mobile device 200 includes at least a bus 206, a controller 208 (such as a CPU), memory 210, a network interface 212, a data storage system 214, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 206 communicatively couples the controller 208, the memory 210, the network interface 212, the data storage system 214 and the other components 216. The computing device 202 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), crosspoint or cross-bar memory, crossbar memory, etc.), and data storage system 214, which communicate with each other via bus 206 (which can include multiple buses).

To put it another way, FIG. 2 is a block diagram of mobile device 200 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 212) to other machines in a LAN, an intranet, an extranet, and/or the Internet (e.g., see network(s) 120). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communication networks (such as network(s) 120).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the mobile device 200. The memory 210 can have execution capabilities such as it can at least partly execute instructions residing in the memory.

The networked system 100 includes computing devices (e.g., see computing devices 122a to 122c as well as mobile device 200), and each of the computing devices can include one or more buses, a controller, a memory, a network interface, a storage system, and other components. Also, each of the computing devices shown in FIGS. 1 and 2 can be or include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 120 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the computing or mobile devices described herein (such as computing devices 122a to 122c as well as mobile device 200) can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the mobile device 200 shown in FIG. 2 as well as the computing system in the base station 102 shown in FIG. 1 (e.g., see the combination of the controller 106, the network interface device 108, the bus 104, and the memory modules 110a and 110b), the term "machine" shall also be taken to include any collection of machines that individually or jointly execute a set (or multiple sets) of instructions to perform one or more of the methodologies or operations discussed herein. And, each of the illustrated computing or mobile devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 4:
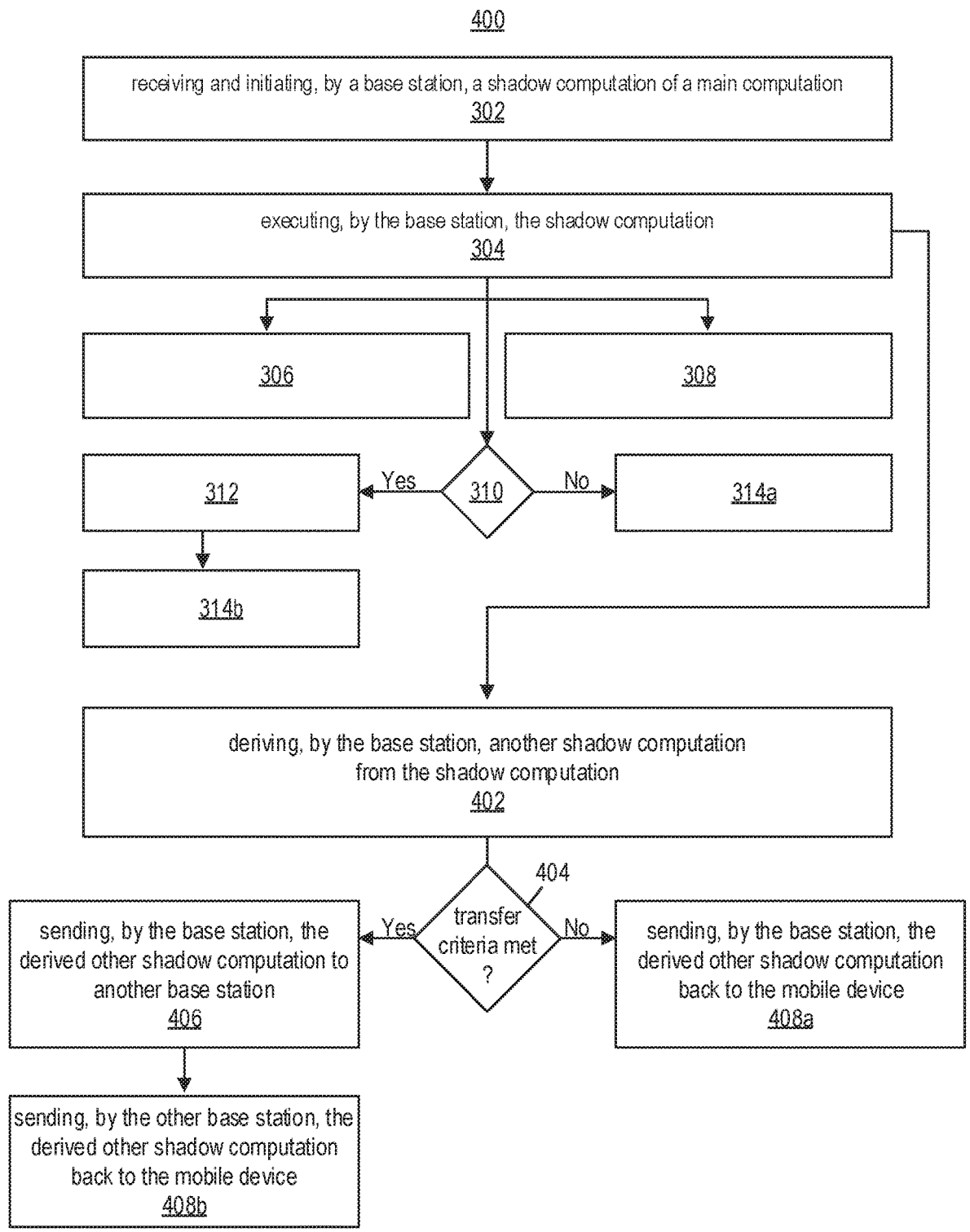

FIGS. 3 and 4 illustrate flow diagrams of example operations of methods 300 and 400 respectively that can be performed by the base stations shown in FIGS. 1 and 2, in accordance with some embodiments of the present disclosure. In some embodiments, the example operations of methods 300 and 400 can be performed by one or more special-purpose controllers (e.g., see special-purpose controller 114). And, in such embodiments, sending and receiving operations can occur via one or more network interfaces (e.g., see network interface 108 or network interface 116) and one or more communication networks (e.g., see network(s) 120).

In FIG. 3, the method 300 begins at step 302 with receiving and initiating, by a base station (such as a cellular base station), a shadow computation of a main computation executing for a mobile device. The initiating can be performed by one or more special-purpose controllers and the receiving can be performed by the one or more special-purpose controllers via one or more network interfaces. The main computation can include a computational task, and the shadow computation can be at least a part of or a derivative of the main computation. The shadow computation can be for a general computing device too. And, the mobile device or another computing device can send the shadow computation to the base station. In other words, the shadow computation can be received from the mobile device or another computing device.

At step 304, the method 300 continues with executing, by the base station, the shadow computation.

At step 306, the method 300 continues with sending, by the base station, output data of the executed shadow computation to the mobile device or to another device. Several devices can rely on data output produced by a shadow computation.

At step 308, the method 300 continues with sending, by the base station, output data of the executed shadow computation to another base station (such as another cellular base station). In some cases, several base stations can communicate or exchange intermediate outputs in order to produce shadow computation and the computation's output.

At step 310, the method 300 continues with determining whether one or more transfer criteria are met. The determining whether the one or more transfer criteria are met can include determining whether the mobile device is within a threshold distance of the other base station, determining whether the other base station experiences less network traffic than the base station, determining whether the other base station has greater compute capabilities than the base station, or any combination thereof.

At step 312, the method 300 continues with sending, by the base station, the shadow computation to another base station (such as another cellular base station), when the one or more transfer criteria are met. For example, at step 312, the method 300 can include sending, by the base station, the shadow computation to the other base station when the mobile device is within a threshold distance of the other base station. Also, for example, at step 312, the method 300 can include sending, by the base station, the shadow computation to the other base station when the other base station experiences less network traffic than the base station. Also, for example, at step 312, the method 300 can include sending, by the base station, the shadow computation to the other base station when the other base station has greater compute capabilities than the base station. When the shadow computation is sent or transferred to the other base station, the base station can retain the shadow computation as well.

At step 314a, the method 300 continues with sending, by the base station, the shadow computation back to the mobile device. The base station sends the shadow computation back to the mobile device since the shadow computation was not transferred to another base station via step 312.

At step 314b, the method 300 continues with sending, by the other base station, the shadow computation back to the mobile device. The other base station sends the shadow computation back to the mobile device since the shadow computation was transferred to the other base station via step 312. When the shadow computation is sent or transferred to the other base station, the base station can retain the shadow computation as well and return the shadow computation to the mobile device too.

As shown in FIG. 4, the method 400 includes all the steps of method 300, and additionally includes steps 402, 404, 406, 408a, and 408b.

The method 400 can begin with step 302 with receiving and initiating, by a base station (such as a cellular base station), a shadow computation of a main computation executing for a mobile device. And, the method 400 can continue with, at step 304, executing, by the base station, the shadow computation. Then, after step 304, method 400 diverges. The method can continue with the remainder of the steps of the method 300 (including steps 306, 308, 310, 312, 314a, and 314b) and/or the method can continue with the additional steps 402, 404, 406, 408a, and 408b.

At step 402, the method 400 continues with deriving, by the base station, another shadow computation from the shadow computation.

At step 404, the method 400 continues with determining whether one or more transfer criteria are met. The determining whether the one or more transfer criteria are met can include determining whether the mobile device is within a threshold distance of the other base station, determining whether the other base station experiences less network traffic than the base station, determining whether the other base station has greater compute capabilities than the base station, or any combination thereof.

At step 406, the method 400 continues with sending, by the base station, the derived other shadow computation to another base station (such as another cellular base station), when the one or more transfer criteria are met. For example, at step 406, the method 400 can include sending, by the base station, the derived other shadow computation to the other base station when the mobile device is within a threshold distance of the other base station. Also, for example, at step 406, the method 400 can include sending, by the base station, the derived other shadow computation to the other base station when the other base station experiences less network traffic than the base station. Also, for example, at step 406, the method 400 can include sending, by the base station, the derived other shadow computation to the other base station when the other base station has greater compute capabilities than the base station. When the derived other shadow computation is sent or transferred to the other base station, the base station can retain the derived other shadow computation as well.

At step 408a, the method 400 continues with sending, by the base station, the derived other shadow computation back to the mobile device. The base station sends the derived other shadow computation back to the mobile device since the derived other shadow computation was not transferred to another base station via step 406.

At step 408b, the method 400 continues with sending, by the other base station, the derived other shadow computation back to the mobile device. The other base station sends the derived other shadow computation back to the mobile device since the derived other shadow computation was transferred to the other base station via step 406. When the derived other shadow computation is sent or transferred to the other base station, the base station can retain the derived other shadow computation as well and return the derived other shadow computation to the mobile device too.

In some embodiments, it is to be understood that steps of methods 300 and/or 400 can be implemented as a continuous process such as each step can run independently by monitoring input data, performing operations and outputting data to the subsequent step. Also, the steps can be implemented as discrete-event processes such as each step can be triggered on the events it is supposed to triggered on and produce a certain output. It is to be also understood that each of FIGS. 3 and 4 represent a minimal method within a possible larger method of a system more complex than the ones presented partly in FIGS. 1 and 2.

In some embodiments, a non-transitory computer-readable storage medium tangibly encoded with computer-executable instructions (e.g., see memory modules 110a and 110b), that when executed by a processor (e.g., see special-purpose controller 114) associated with a computing device, can perform a method such as a method including any one or more of the operations described herein.

Figure 5:
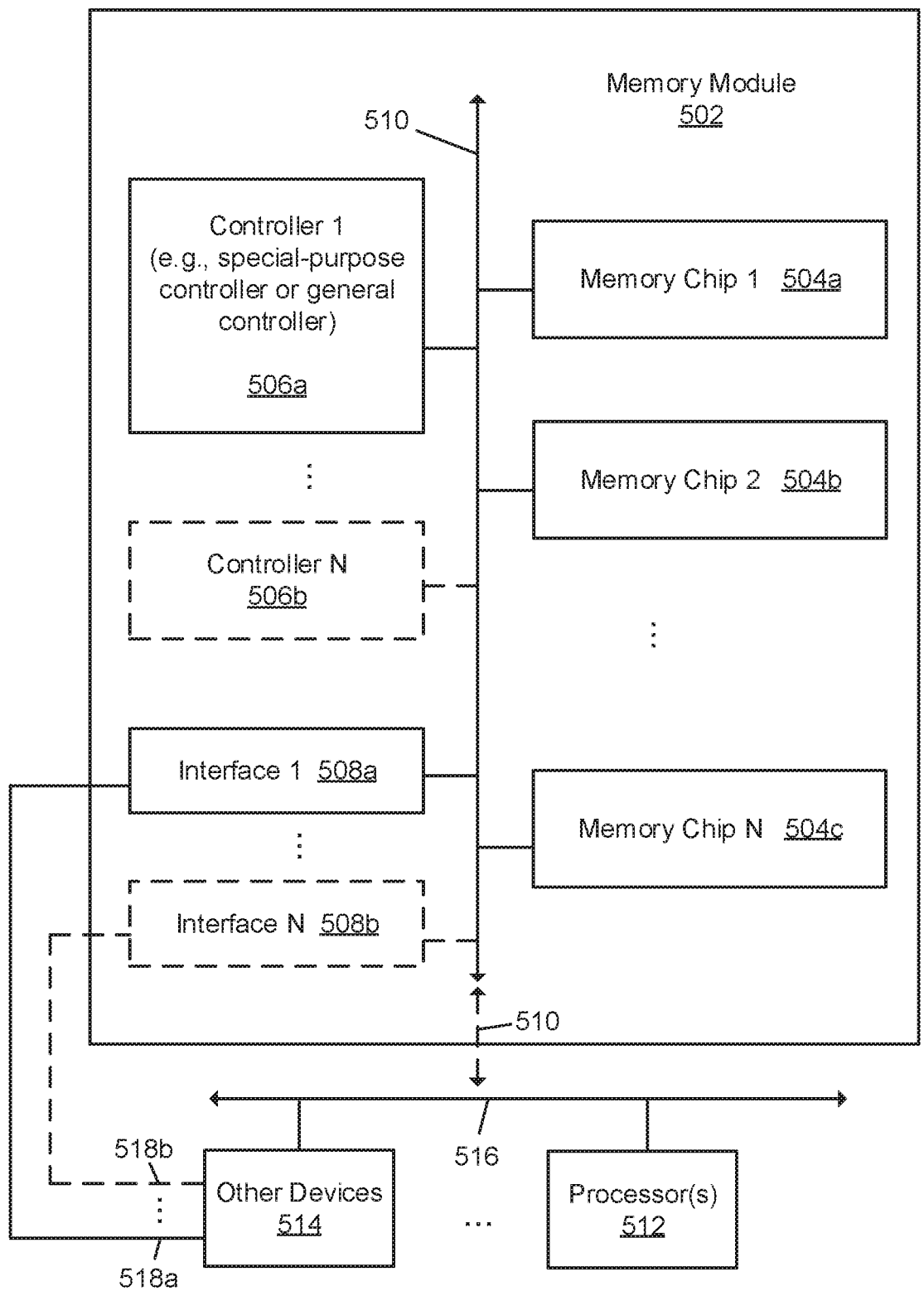
FIGS. 5 and 6 illustrate example memory modules, in accordance with some embodiments of the present disclosure.
Figure 6:
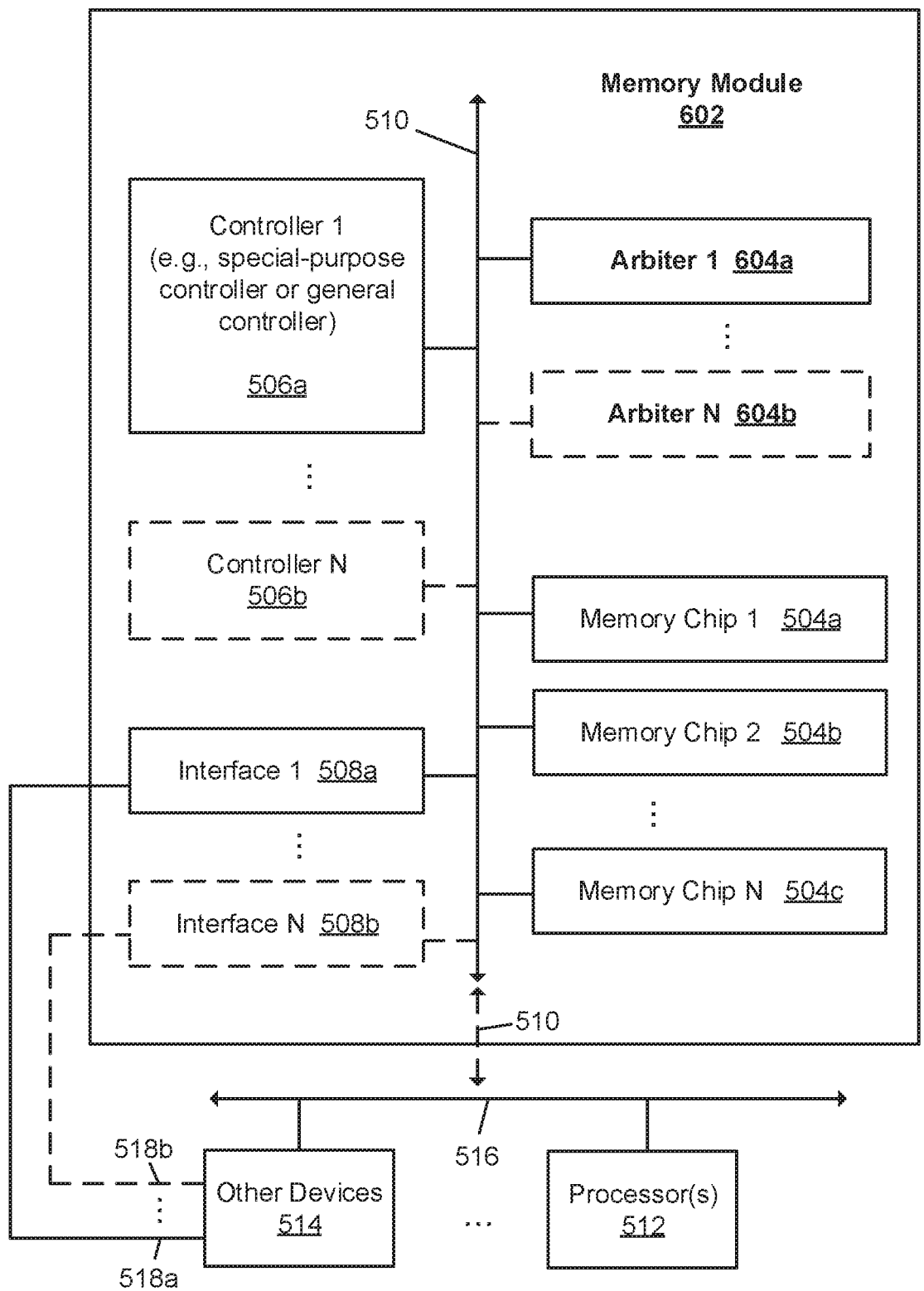

FIGS. 5 and 6 illustrate example memory modules 502 and 602 respectively, in accordance with some embodiments of the present disclosure. Either of the memory modules 502 or 602 can be, include, or be a part of an apparatus and/or a system.

FIG. 5 shows the memory module 502 having a plurality of memory chips (e.g., see memory chips 504a, 504b, and 504c). The memory module 502 also has at least one controller (e.g., see controllers 506a and 506b). As shown, different embodiments of the memory module 502 can have one controller (e.g., controller 506a), two controllers (e.g., controllers 506a and 506b), or more than two controllers. It is to be understood that the dashed-lined boxes represent optional components. Also, it is to be understood that an embodiment of the memory module 502 can have two memory chips or more than two memory chips.

Memory described herein, such as memory of the memory modules, can include various types of memory. For example, such memory can include flash memory having flash memory cells. Also, for example, such memory can include dynamic random-access memory (DRAM) including DRAM cells. Also, for example, such memory can also include non-volatile random-access memory (NVRAM) including NVRAM cells. The NVRAM cells can include 3D XPoint memory cells.

The memory module 502 is also shown having at least one interface device (e.g., see interface devices 508a and 508b). As shown, different embodiments of the memory module 502 can have one interface device (e.g., interface device 508a), two interface devices (e.g., interface devices 508a and 508b), or more than two interface devices. And, as mentioned, it is to be understood that the dashed-lined boxes represent optional components. The at least one interface device (e.g., see interface devices 508a and 508b) can be configured to communicate input and output data for the memory module 502. The input and output data can bypass at least one processor (e.g., the main processor) of a system in which the memory module 502 is installed (e.g., see interfaces 508a and 508b being connected to other devices 514 of a system in which the memory module 502 is installed and bypassing at least one processor 512 of the system in which the memory module is installed, via connections 518a and 518b). In some embodiments, as shown in FIG. 5, the input and output data bypasses a data bus (such as the main data bus) of the system in which the memory module 502 is installed (e.g., see interfaces 508a and 508b being connected to other devices 514 of the system in which the memory module is installed and bypassing bus 516 of the system (which can include multiple busses) in which the memory module is installed, via connections 518a and 518b). It is to be understood that the dashed-lined connections represent optional connections.

The memory module 502 is also shown having a bus 510 (which can include multiple busses) that connects the plurality of memory chips (e.g., see memory chips 504a, 504b, and 504c), the controller(s) (e.g., see controllers 506a and 506b), and the interface device(s) (e.g., see interface devices 508a and 508b). The bus 510 can be a part of a bus of the system in which the memory module is installed (e.g., see bus 516), which connects the memory module 502 to the rest of the system in which it is installed. As shown by the dashed-lined portion of the bus 510 that connects the memory module to the bus 516 and the rest of the system, bus 510 may be separate from bus 516 in some embodiments and in other embodiments it may be connected to the bus 516. It is to be understood that the dashed-lined connections represent optional connections. One or more of the controllers of the memory module 502 (e.g., see controllers 506a and 506b) can arbitrate data communicated over bus 510 and connections that bypass the bus 516 (e.g., see connections 518a and 518b).

The interface devices and other interface devices mentioned herein can include one or more network interface devices, one or more links, one or more buses, one or more ports, one or more peer-to-peer links, or any combination thereof.

In some embodiments, the memory module 502 can implement a global shared context. In general, a global shared context includes a plurality of instances of the memory module 502 or 602 communicating with each other via their interface devices. The global shared context can be beneficial for graphics processing and graphics applications since large amounts of memory is useful and data processing proximate to memory can improve graphics processing. In such embodiments and others, the interface device(s) (e.g., see interface devices 508a and 508b) can be configured to communicate the input and output data to at least one other instance of the memory module installed in the system in which the communicating memory module is installed.

In some embodiments, the memory module 502 or another memory module described herein, the controller 506a or another controller described herein, the interface device 508a or another interface device described herein, the memory chips 504a, 504b, and 504c or other memory chips described herein, or any combination thereof can be a part of a system on chip (SoC), system on package (SoP) such as an interposed chiplet system, or a heterogeneous die stack or alike. All of these embodiments represent tightly integrated IP blocks and chips not necessarily including a PCB for coupling with each other and the rest of the system. Embodiments including or being a part of an SoC or other embodiments can include one or more GPUs or one or more other types of specialty processors and/or one or more PIM units. Embodiments including or being a part of an SoC or other embodiments can include processors that can include or are connected to a memory controller, a display sink (e.g. HDMI or DisplayPort), a radio for a wireless interface or network, an AI engine or accelerator, scaler-type processors, vector-type processors, CPU cores, and the like.

Not shown in FIG. 5, the memory module 502 can also include a plurality of electrical contacts. The memory module 502 can also include a PCB configured for insertion into a memory slot of a motherboard. In such embodiments, the plurality of memory chips (e.g., see memory chips 504a, 504b, and 504c) can be coupled to the PCB, and the plurality of electrical contacts can be on each side of the PCB. Also, the controller(s) (e.g., see controllers 506a and 506b) can be coupled to the PCB, and the interface device(s) (e.g., see interface devices 508a and 508b) can be coupled to the PCB.

In some embodiments, the controller(s) (e.g., see controllers 506a and 506b) can be, include, or be a part of at least one special-purpose controller. The special-purpose controller(s) can be, include, or be a part of a GPU, an AI accelerator, a neural processing unit (NPU), another type of special-purpose controller, a PIM unit, or any combination thereof.

In some embodiments, the interface device(s) (e.g., see interface devices 508a and 508b) can include at least one wireless interface device that communicates at least in part wirelessly or can include intra-chip optical interconnect that provides optical communication between chips. Another part of the interface device(s) can communicate via a wire. The interface device(s) can also be a hybrid interface device with multiple capabilities and/or channels and channel types. The interface device(s) can be, include, or be a part of a network interface device (such as a wireless network interface device). The interface device(s) can include at least one wireless interface device and/or wired links can be configured to communicate over one or more wired and/or wireless networks, peer-to-peer links, ports, buses, etc.

In some embodiments, the memory module 502 can include first connections configured to connect the plurality of memory chips (e.g., memory chips 504a, 504b, and 504c)

to at least some of the plurality of electrical contacts to communicate input and output data of the plurality of memory chips to a processor of a computing device in which the memory module 502 is installed (such as the main processor of the computing device). The memory module 502 can also include second connections configured to connect the plurality of memory chips to the controller(s) (e.g., see controllers 506a and 506b). The memory module 502 can also include one or more third connections configured to connect the controller(s) to the interface device(s) (e.g., see interface devices 508a and 508b) so that the interface device(s) receives input data for the controller(s) from other devices and communicates output data of the controller(s) to other devices via a communications path that bypasses a processor of the computing device in which the memory module 502 is installed.

FIG. 6 shows a memory module 602 that is somewhat similar to memory module 502. However, memory module 602 is shown having at least one arbiter (e.g., see arbiters 604a and 604b). FIG. 6 shows the memory module 602 having a similar plurality of memory chips as the chips shown in FIG. 5 (e.g., see memory chips 504a, 504b, and 504c). The memory module 602 also has at least one controller similar to the at least one controller shown in FIG. 5 (e.g., see controllers 506a and 506b). As shown in FIG. 6 as well, different embodiments of the memory module 502 can have one controller (e.g., controller 506a), two controllers (e.g., controllers 506a and 506b), or more than two controllers. It is to be understood that the dashed-lined boxes represent optional components. Also, it is to be understood that an embodiment of the memory module 602 can have two memory chips or more than two memory chips.

Also, as show in FIG. 6, the memory module 602 is depicted having at least one interface device similar to the at least one interface device shown in FIG. 5 (e.g., see interface devices 508a and 508b). As shown, different embodiments of the memory module 602 can have one interface device (e.g., interface device 508a), two interface devices (e.g., interface devices 508a and 508b), or more than two interface devices. And, as mentioned, it is to be understood that the dashed-lined boxes represent optional components. The interface device(s) (e.g., see interface devices 508a and 508b) can be configured to communicate input and output data for the memory module 602. The input and output data can bypass a processor (e.g., the main processor) of a system in which the memory module 602 is installed. In some embodiments, the input and output data bypasses a data bus (such as the main data bus) of the system in which the memory module 602 is installed.

Additionally, as mentioned and as shown in FIG. 6, the memory module 602 includes at least one arbiter (e.g., arbiters 604a and 604b). The at least one arbiter can be configured to resolve conflicts when the processor of the hosting computing device attempts to access data in the plurality of memory chips (e.g., see memory chips 504a and 504b) while the controller(s) (e.g., see controllers 506a and 506b) is accessing the plurality of memory chips. As shown, different embodiments of the memory module 602 can have one arbiter (e.g., arbiter 604a), two arbiters (e.g., arbiters 604a and 604b), or more than two arbiters. And, as mentioned, it is to be understood that the dashed-lined boxes and connections represent optional components.

In some embodiments, the arbiters can be part of the controllers such that each controller has one arbiter to arbitrate access to memory chips among all devices that access these chips and external devices (main processor and system). In other embodiments the arbiters can be part of memory chips such that each arbiter would queue the memory requests to respective chip in order of processing and can resolve conflicts associated with requests to the same address within a memory chip. Also, in some embodiments, one or more of the arbiters of the memory module 202 (e.g., see arbiters 604a and 604b) can arbitrate data communicated over bus 510 and connections that bypass the bus 516 of the system in which the memory module 602 is stalled (e.g., see connections 518a and 518b).

As mentioned and shown in FIGS. 5 and 6, the memory module 502 and the memory module 602 include a plurality of memory chips, at least one controller (e.g., at least one special-purpose controller), and at least one interface device configured to communicate input and output data for the memory module. The input and output data bypasses a processor of a computing device in which the memory module 502 or 602 is installed. And, the interface device(s) can be configured to communicate the input and output data to at least one other memory module in the computing device (not depicted in FIGS. 5 and 6). In some embodiments, input and output data or a part of it is communicated via and processed by the main processor (such as to register a memory module's state).

The interface device(s) of the memory module 502 or 602 can include at least one network interface device that can be configured to communicate input and output data of the controller(s) over one or more communication networks. The controller(s) can include a GPU, an AI accelerator, a NPU, another type of special-purpose controller, a PIM unit, or any combination thereof. The at least one interface device of the memory module 502 or 602 can include at least one wireless interface device configured to communicate at least in part wirelessly over one or more wireless communication networks or can include intra-chip optical interconnect that provides optical communication between chips, and the one or more wireless communication networks or the intra-chip optical interconnect can bypass a data bus (such as a main data bus) of the computing device in which the memory module 502 or 602 is installed. In some embodiments, a wireless communication can occur among multiple memory modules installed in the system. For example, a wireless receiver can allow for data communications between aligned-in-space modules in close proximity (like DIMMs installed in a PC board). This can increase speeds of such communications. Specifically, in some embodiments, Terahertz Wireless Communication (THz) can enable speeds of $100s$ Gb/sec. Thus, in such examples, intra-chip or intra-module THz radiation can support large volume of data exchange amongst memory modules disclosed herein.

And, as shown specifically in FIG. 6, the memory module 602 includes at least one arbiter configured to resolve conflicts when the processor of the computing device having the memory module attempts to access data in the plurality of memory chips while the controller(s) of the memory module is accessing the plurality of memory chips of the memory module.

Figure 7:
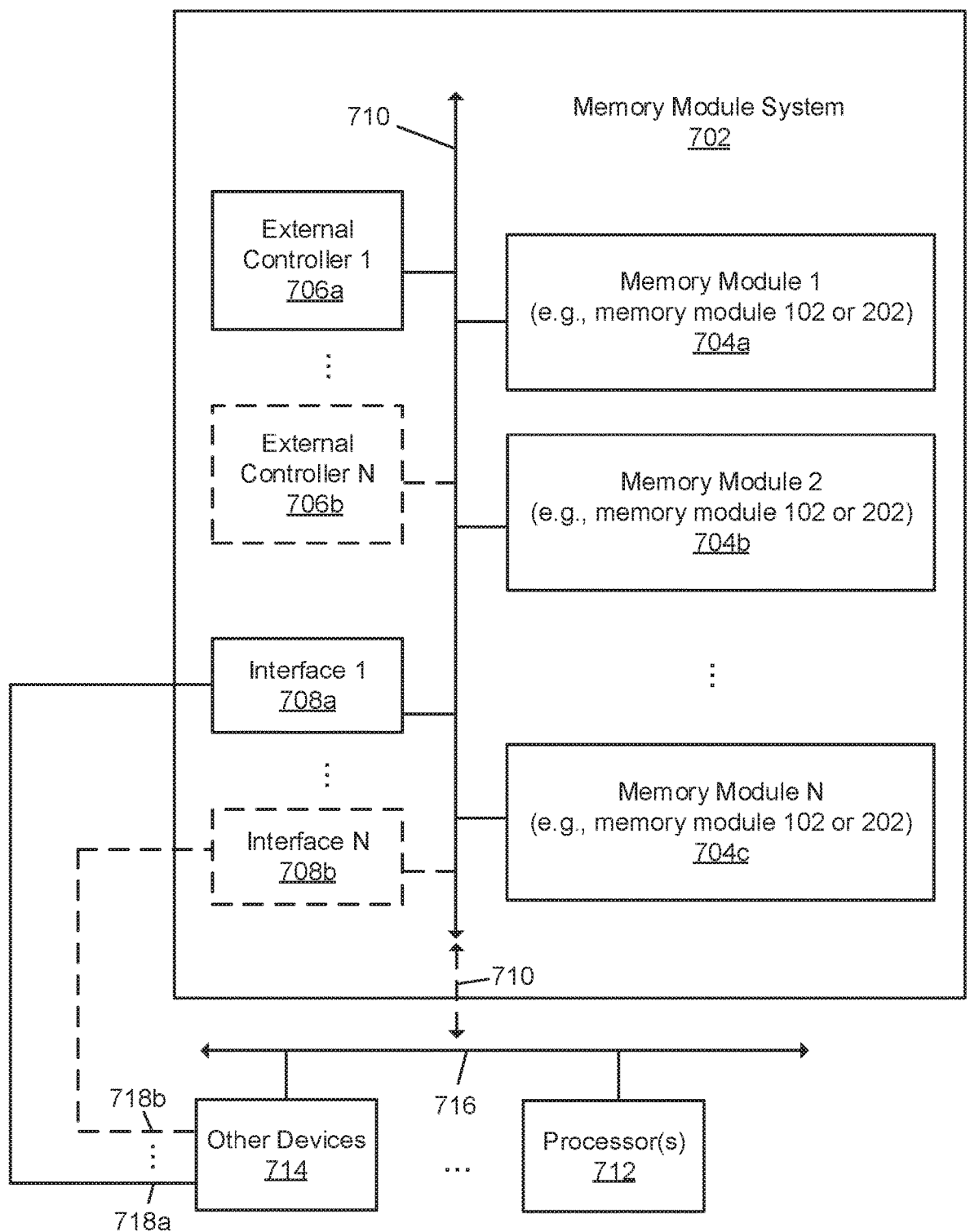
FIGS. 7 and 8 illustrate example memory module systems, in accordance with some embodiments of the present disclosure.
Figure 8:
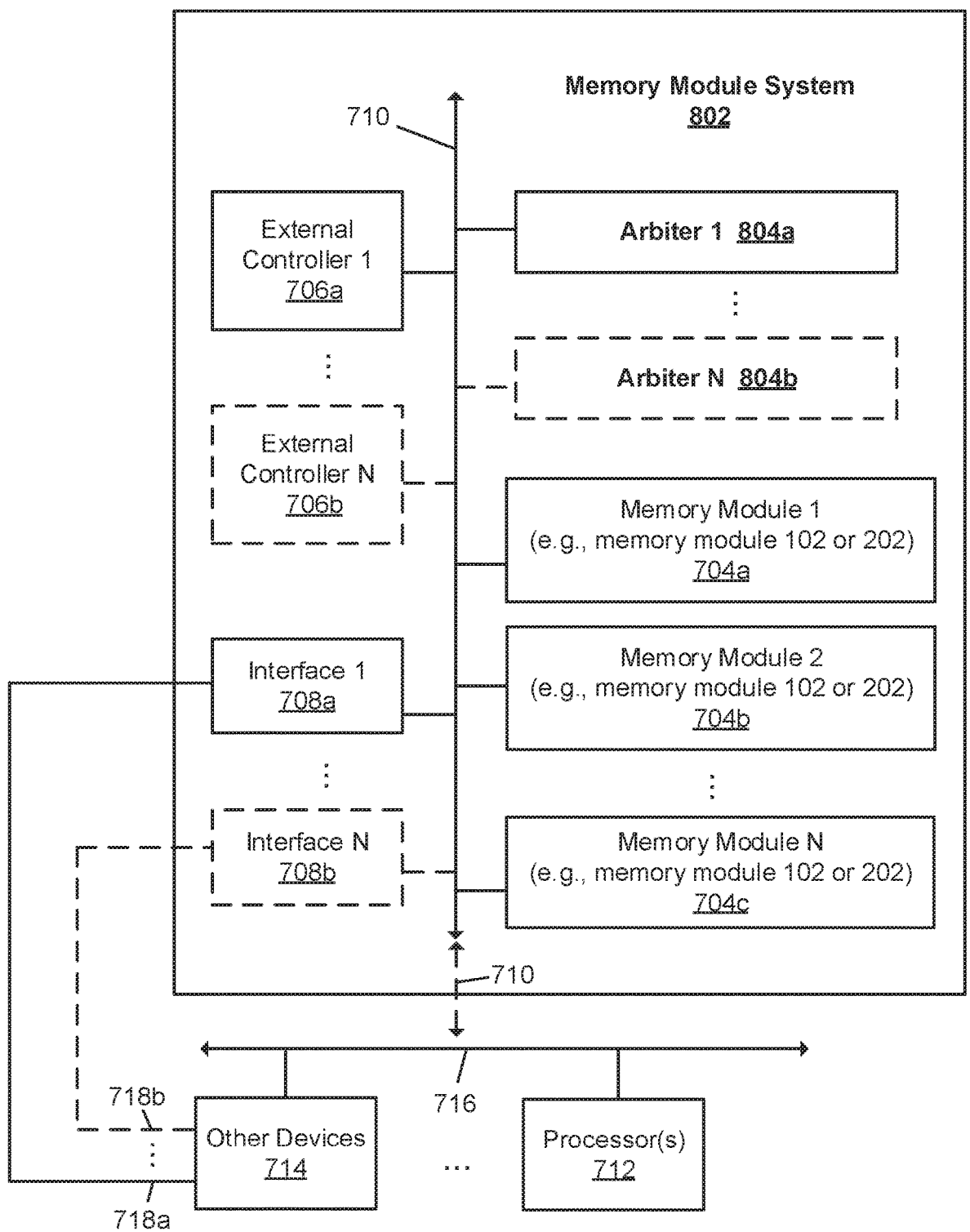

FIGS. 7 and 8 illustrate example memory module systems 702 and 802 respectively, in accordance with some embodiments of the present disclosure. FIG. 8 shows the memory module system 802 which is somewhat similar to memory module system 702 depicted in FIG. 7. However, memory module system 802 is shown having at least one arbiter (e.g., see arbiters 804a and 804b). The at least one arbiter shown as included in the memory module system 802 is configured to resolve conflicts when a processor of the computing device having or hosting the memory module system 802 attempts to access data in one or more memory chips of the memory module system while at least one controller within the memory module system is accessing the memory chips.

Both of the depicted memory module systems 702 and 802 include a plurality of memory modules (e.g. see memory modules 704a, 704b, and 704c). And, each of the memory modules includes a plurality of memory chips. Each memory module of the plurality of memory modules (e.g. see memory modules 704a, 704b, and 704c) can be the memory module 502 or the memory module 602. The memory module systems 702 and 802 each also include at least one external controller (e.g., see external controllers 706a and 706b) and at least one interface device (e.g., see interface devices 708a and 708b).

The memory module systems 702 and 802 are each shown having a bus 710 (which can include multiple busses) that connects the plurality of memory modules (e.g., see memory modules 704a, 704b, and 704c), the at least one external controller (e.g., see external controllers 706a and 706b), and the at least one interface device (e.g., see interface devices 708a and 708b).

The memory module systems 702 and 802 are each also shown having at least one interface device (e.g., see interface devices 708a and 708b). As shown, different embodiments of the memory modules 702 and 802 can have one interface device (e.g., interface device 708a), two interface devices (e.g., interface devices 708a and 708b), or more than two interface devices. And, as mentioned, it is to be understood that the dashed-lined boxes represent optional components. The at least one interface device (e.g., see interface devices 708a and 708b) can be configured to communicate input and output data for each of the memory module systems 702 and 802. The input and output data can bypass a processor (e.g., the main processor) of a respective system in which one of the memory module systems 702 and 802 is installed (e.g., see interfaces 708a and 708b being connected to other devices 714 of a system in which one of the memory module systems 702 and 802 is installed and bypassing at least one processor 712 of the system, via connections 718a and 718b). In some embodiments, as shown in FIG. 7, the input and output data bypasses a data bus (such as the main data bus) of the system in which one of the memory module systems 702 and 802 is installed (e.g., see interfaces 708a and 708b being connected to other devices 714 of the system and bypassing bus 716 of the system (which can include multiple busses), via connections 718a and 718b). It is to be understood that the dashed-lined connections represent optional connections.

Also, the bus 710 can be a part of a bus of the system in which one of the memory module systems 702 and 802 is installed (e.g., see bus 716), which connects one of the memory module systems 702 and 802 to the rest of the system in which it is installed. As shown by the dashed-lined portion of the bus 710 that connects the memory module system to the bus 716 and the rest of the system, the bus 710 may be separate from bus 716 in some embodiments and in other embodiments it may be connected to the bus 716. It is to be understood that the dashed-lined connections represent optional connections. One or more of the controllers of each of the memory module systems 702 and 802 (e.g., see controllers 706a and 706b) can arbitrate data communicated over bus 710 and connections that bypass the bus 716 (e.g., see connections 718a and 718b).

As shown, the external controller(s) (e.g., see external controllers 706a and 706b) is separate from the plurality of memory modules (e.g. see memory modules 704a, 704b, and 704c) in each of the memory module systems 702 and 802. In some embodiments of the memory module systems 702 and 802, the external controller(s) can be configured to coordinate computations by the controllers of the plurality of memory modules (e.g., see the controllers 506a and 506b and the memory modules 502, 602, and 704a to 704c). Also, the external controller(s) can be configured to coordinate communications by the interface devices of the plurality of memory modules (e.g., see interface devices 508a and 508b and the memory modules 502, 602, and 704a to 704c).

Also, as shown, the interface device(s) (e.g., see interface devices 708a and 708b) is separate from the plurality of memory modules (e.g. see memory modules 704a, 704b, and 704c) in each of the memory module systems 702 and 802. The at least one interface device of the memory module systems 702 and 802 (e.g., see interface devices 708a and 708b) can include at least one wireless interface device that communicates at least in part wirelessly or can include intra-chip optical interconnect that provides optical communication between chips. Another part of the interface device(s) of the memory module systems 702 and 802 can communicate via a wire. The at least one interface device of the memory module systems 702 and 802 can also be a hybrid interface device with multiple capabilities and/or channels and channel types. The interface device(s) of the memory module systems 702 and 802 can be, include, or be a part of a network interface device (such as a wireless network interface device). The interface(s) device of the memory module systems 702 and 802 can include at least one wireless interface device and/or wired links can be configured to communicate over one or more wired and/or wireless networks, peer-to-peer links, ports, buses, etc.

Also, the plurality of memory modules (e.g. see memory modules 704a, 704b, and 704c) can be a plurality of different types of memory structures. For example, the plurality of memory modules can be, be a part of, or include one or more DIMMs, one or more SO-DIMMs, one or more RDIMMs, one or more mini-RDIMMs, one or more socketed memory stacks, one or more socketed systems on package or another type of PoP for memory, one or more of a different type of memory structure or module, or any combination thereof.

Also, each memory module described herein can be a different type of memory structure. For example, a memory module described herein can be, be a part of, or include a DIMM, a SO-DIMM, a RDIMM, a mini-RDIMM, a socketed memory stack, or a socketed system on package or another type of PoP for memory.

For example, in some embodiments of the memory module system 702 or 802, the system can include a plurality of DIMMs. And, each DIMM of the plurality of DIMMs can include a PCB configured for insertion into a memory slot of an additional PCB that is separate from the plurality of DIMMs. Also, each DIMM of the plurality of DIMMs can include a plurality of memory chips coupled to the PCB, a plurality of electrical contacts on each side of the PCB, at least one controller (such as at least one special-purpose controller) coupled to the PCB, and at least one interface device configured to communicate input and output data for the DIMM. The input and output data bypasses at least one processor of a computing device in which the DIMM and the system is installed. And, in such embodiments of systems 702 and 802 having DIMMS, the interface device(s) can be configured to communicate the input and output data to at least one other DIMM of the plurality of DIMMs.

Also, in such embodiments of systems 702 and 802 having DIMMS, an external controller is separate from the plurality of DIMMs and can be is configured to coordinate computations by the special-purpose controllers of the plurality of DIMMs. The external controller can also be configured to coordinate communications by the interface devices of the plurality of DIMMs. And, in such embodiments, the additional PCB is separate from the plurality of DIMMs and can include a plurality of memory slots configured to receive the plurality of DIMMs. Also, the external controller can be coupled to the additional PCB, and the additional PCB can be a motherboard and the external controller can include a central processing unit (CPU) or another type of processor such as a special-purpose controller.

In some embodiments, the at least one controller of each DIMM of the plurality of DIMMs can be a special-purpose controller. For example, the at least one controller can be, be a part of, or include a GPU, an AI accelerator, a NPU, another type of special-purpose controller, a PIM unit, or any combination thereof.

In some embodiments, the interface device(s) of a DIMM of the plurality of DIMMs can include a wireless interface device configured to communicate at least in part wirelessly or can include intra-chip optical interconnect that provides optical communication between chips. And, in such examples, for each DIMM of the plurality of DIMMs, the wireless interface device of the DIMM can be configured to receive input data for the at least one controller and communicate output data of the controller(s) to one or more user interfaces via one or more wireless communication links that bypass the processor of the computing device hosting the system 702 or 802 in which the system is installed. The one or more user interfaces can include one or more of any type of user interface (UI), including tactile UI (touch), visual UI (sight), e.g., GUI, auditory UI (sound), olfactory UI (smell), equilibria UI (balance), gustatory UI (taste), or any combination thereof.

In some embodiments, the DIMMs can communicate with each other via one or more high-speed wireless interfaces. Since DIMMs can be installed, aligned, and close to each other high-speed wireless interfaces with proximate transmitters can be used to transmit data among DIMMs. Also, wire can connect the DIMMs via a side of each DIMM other than the side that connects them to PCB when inserted in memory slots.

Figure 9:
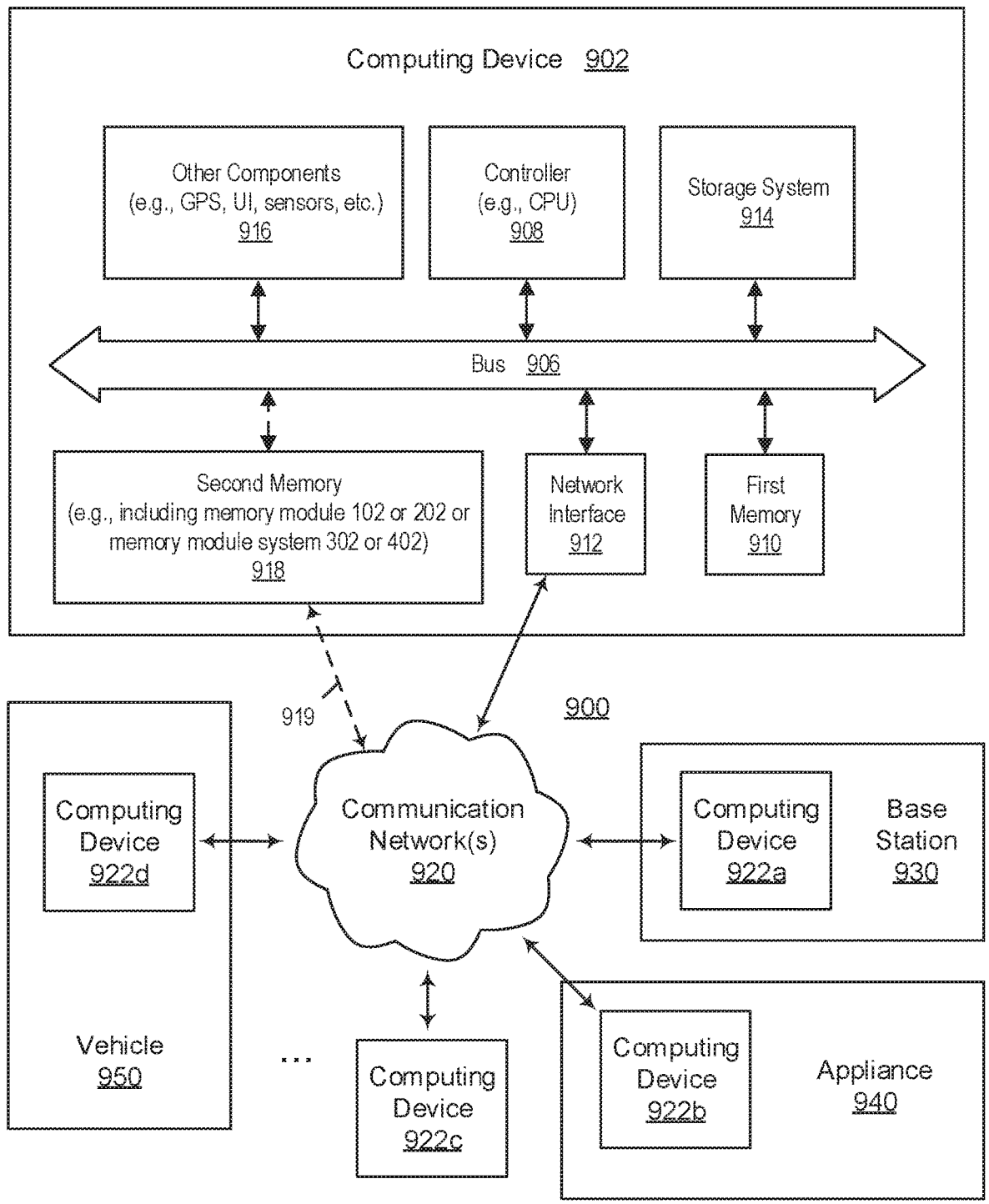
FIG. 9 illustrates an example networked system that includes computing devices, in accordance with some embodiments of the present disclosure.

FIG. 9 illustrates the example networked system 900 that includes at least computing devices 902, 922a, 922b, 922c, and 922d, in accordance with some embodiments of the present disclosure. Also, FIG. 9 illustrates example parts of an example computing device 902 with is part of the networked system 900. And, FIG. 9 shows how such computing devices can be integrated into various machines, apparatuses, and systems, such as IoT devices, mobile devices, communication network devices and apparatuses (e.g., see base station 930), appliances (e.g., see appliance 940), and vehicles (e.g., see vehicle 950).

The computing device 902 and other computing devices of the networked system 900 (e.g., see computing devices 922a, 922b, 922c, and 922d) can be communicatively coupled to one or more communication networks 920. The computing device 902 includes at least a bus 906, a controller 908 (such as a CPU), first memory 910, a network interface 912, a data storage system 914, other components 916 (which can be any type of components found in mobile or computing devices such as GPS components, I/O components such various types of user interface components, and sensors as well as a camera), and second memory 918 (which can include memory module 502 or 602 or memory module system 702 or 802). The other components 916 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 906 communicatively couples the controller 908, the first memory 910, the network interface 912, the data storage system 914 and the other components 916, and can couple such components to the second memory 912 in some embodiments. As mentioned, it is to be understood that the dashed-lined boxes and connections represent optional components.

The computing device 902 includes a computer system that includes at least controller 908, first memory 910 and the second memory 518 (e.g., read-only memory (ROM), flash memory, dynamic random-access memory (DRAM) such as synchronous DRAM (SDRAM) or Rambus DRAM (RDRAM), static random-access memory (SRAM), cross-point or cross-bar memory, crossbar memory, etc.), and data storage system 914, which can communicate with each other via bus 906 (which can include multiple buses). In some embodiments, the second memory 518 may not communicate over bus 506.

To put it another way, FIG. 9 includes a block diagram of computing device 902 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 912) to other machines in a LAN, an intranet, an extranet, and/or the Internet (e.g., see network(s) 920). The machine can operate in the capacity of a server or a client machine in client-server network environment, as a peer machine in a peer-to-peer (or distributed) network environment, or as a server or a client machine in a cloud computing infrastructure or environment.

Controller 908 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 908 can also be one or more special-purpose processing devices such as an ASIC, a programmable logic such as an FPGA, a digital signal processor (DSP), network processor, or the like. Controller 908 is configured to execute instructions for performing the operations and steps discussed herein. Controller 908 can further include a network interface device such as network interface 912 to communicate over one or more communication networks (such as network(s) 920).

The data storage system 914 can include a machine-readable storage medium (also known as a computer-readable medium) on which is stored one or more sets of instructions or software embodying any one or more of the methodologies or functions described herein. The data storage system 914 can have execution capabilities such as it can at least partly execute instructions residing in the data storage system. The instructions can also reside, completely or at least partially, within at least one of the first memory 910 and the second memory 918 and/or within the controller 908 during execution thereof by the computer system, at least one of the first memory 910 and the second memory 918 as well as the controller 908 also constituting machine-readable storage media. The first memory 910 can be or include main memory of the computing device 902. The first memory 910 and the second memory 918 can have execution capabilities such as it can at least partly execute instructions residing in the memory.

As mentioned, the networked system 900 includes computing devices, and each of the computing devices can include one or more buses, a controller, a memory, a network interface, a storage system, and other components. Also, each of the computing devices shown in FIG. 9 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 920 that includes at least a local to device network such as Bluetooth or the like, a wide area network (WAN), a local area network (LAN), an intranet, a mobile wireless network such as 4G or 5G, an extranet, the Internet, and/or any combination thereof. In some embodiments, as shown with the dashed connection 919, the second memory 918 can include at least one network interface so that it can communicate separately with other devices via communication network(s) 920. For example, a memory module or a memory module system of the second memory 918 (e.g., see memory modules 502 and 602, and memory module systems 702 and 802) can have its own network interface so that such a component can communicate separately with other devices via communication network(s) 920.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 902 shown in FIG. 9, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   initiating, at a cellular base station, a shadow computation of a main computation executing for a mobile device, wherein the main computation comprises a computational task, and wherein the shadow computation is at least a part of or a derivative of the main computation; and
   executing, by the cellular base station, the shadow computation;
   determining that a transfer criterion for sending the shadow computation to a different base station is met, wherein the determination that the transfer criterion is met comprises a determination that the different base station has less network traffic than the cellular base station or that the different base station has greater compute capability that the cellular base station; and
   sending, by the cellular base station, the shadow computation to the different base station based on the determination that the transfer criterion is met.

2. The method of claim 1, comprising sending, by the cellular base station, output data of the shadow computation to the mobile device or to another device.

3. The method of claim 1, comprising sending, by the cellular base station, output data of the shadow computation to the different base station.

4. The method of claim 1, comprising sending, by the cellular base station, the shadow computation to the different base station when the mobile device is within a threshold distance of the different base station.

5. The method of claim 1, comprising sending, by the cellular base station, the shadow computation to the different base station when the different base station experiences less network traffic than the cellular base station.

6. The method of claim 1, comprising sending, by the cellular base station, the shadow computation to the different base station when the different base station has greater compute capabilities than the cellular base station.

7. The method of claim 1, comprising sending, by the different base station, the shadow computation back to the mobile device.

8. The method of claim 1, comprising:
   deriving, by the cellular base station, at least one other shadow computation from the shadow computation; and
   sending, by the cellular base station, the at least one other shadow computation to at least one device other than the cellular base station.

9. The method of claim 8, comprising sending, by the cellular base station, the at least one other shadow computation to another cellular base station.

10. The method of claim 1, wherein the computational task comprises a self-consistent sequence of operations leading to a desired result.

11. The method of claim 1, wherein executing the shadow computation comprises executing a set of instructions stored on a non-transitory computer readable medium.

12. The method of claim 1, wherein the main computation comprises a plurality of computational tasks, at least a first computational task of the plurality of computational tasks is performed by the cellular base station as part of or as the shadow computation, and at least a second computational task of the plurality of computations is performed by the mobile device as part of the main computation.

13. A system for a base station, comprising:
   a plurality of memory modules, each memory module configured for insertion into a printed circuit board (PCB), and each memory module comprising:
   a plurality of memory chips; and
   at least one graphics processing unit (GPU) coupled to the plurality of memory chips, configured to:
      initiate a shadow computation of a main computation executing for a mobile device, wherein the main computation comprises a computational task, and wherein the shadow computation is at least a part of or a derivative of the main computation;
      execute the shadow computation;
      determine that a transfer criterion for transferring the shadow computation to a different base station is met, wherein the determination that the transfer criterion is met comprises a determination that:
         the different base station has less network traffic than the base station, or
         the different base station has greater compute capability than the base station; and
      send the shadow computation to the different base station in response to the determination that the transfer criterion is met.

14. The system of claim 13, wherein the at least one GPU is configured to send output data of the executed shadow computation to the mobile device.

15. The system of claim 13, wherein the at least one GPU is configured to send output data of the executed shadow computation to another cellular base station.

16. The system of claim 13, wherein the at least one GPU is configured to send the shadow computation to the different base station when the mobile device is within a threshold distance of the different base station.

17. The system of claim 13, wherein the at least one GPU is configured to send the shadow computation to the different base station when the different base station experiences less network traffic than the base station.

18. The system of claim 12, wherein the at least one GPU is configured to send the shadow computation to the different base station when the different base station has greater compute capabilities than the base station.

19. The system of claim 13, wherein the at least one GPU is configured to send the shadow computation back to the mobile device.

20. The system of claim 13, wherein the shadow computation comprises a graphics processing computation executed by the GPU of the base station for the mobile device.

21. The system of claim 13, wherein the determination that the transfer criterion is met comprises a determination that the different base station has less network traffic than the base station.

22. A system for a base station, comprising:
   a plurality of memory modules, each memory module configured for insertion into a printed circuit board (PCB), and each memory module comprising:
   a plurality of memory chips; and
   at least one artificial intelligence (AI) accelerator coupled to the plurality of memory chips, configured to:
      receive a shadow computation of a main computation executing for a mobile device, wherein the main computation comprises a computational task, and wherein the shadow computation is at least a part of or a derivative of the main computation; and execute the shadow computation, wherein the shadow computation comprises a computation for an artificial intelligence algorithm executed by the AI accelerator of the base station for the mobile device.

23. The system of claim 12, wherein the determination that the transfer criterion is met comprises a determination that the different base station has greater compute capability than the base station.

24. A method, comprising:

initiating, at a cellular base station comprising at least one artificial intelligence (AI) accelerator coupled to a plurality of memory chips, a shadow computation of a main computation executing for a mobile device, wherein the main computation comprises a computational task, and wherein the shadow computation is at least a part of or a derivative of the main computation; and executing, by the cellular base station, the shadow computation, wherein the shadow computation comprises a computation for an artificial intelligence algorithm executed by the AI accelerator of the base station for the mobile device.

\* \* \* \* \*